United States Patent Office.

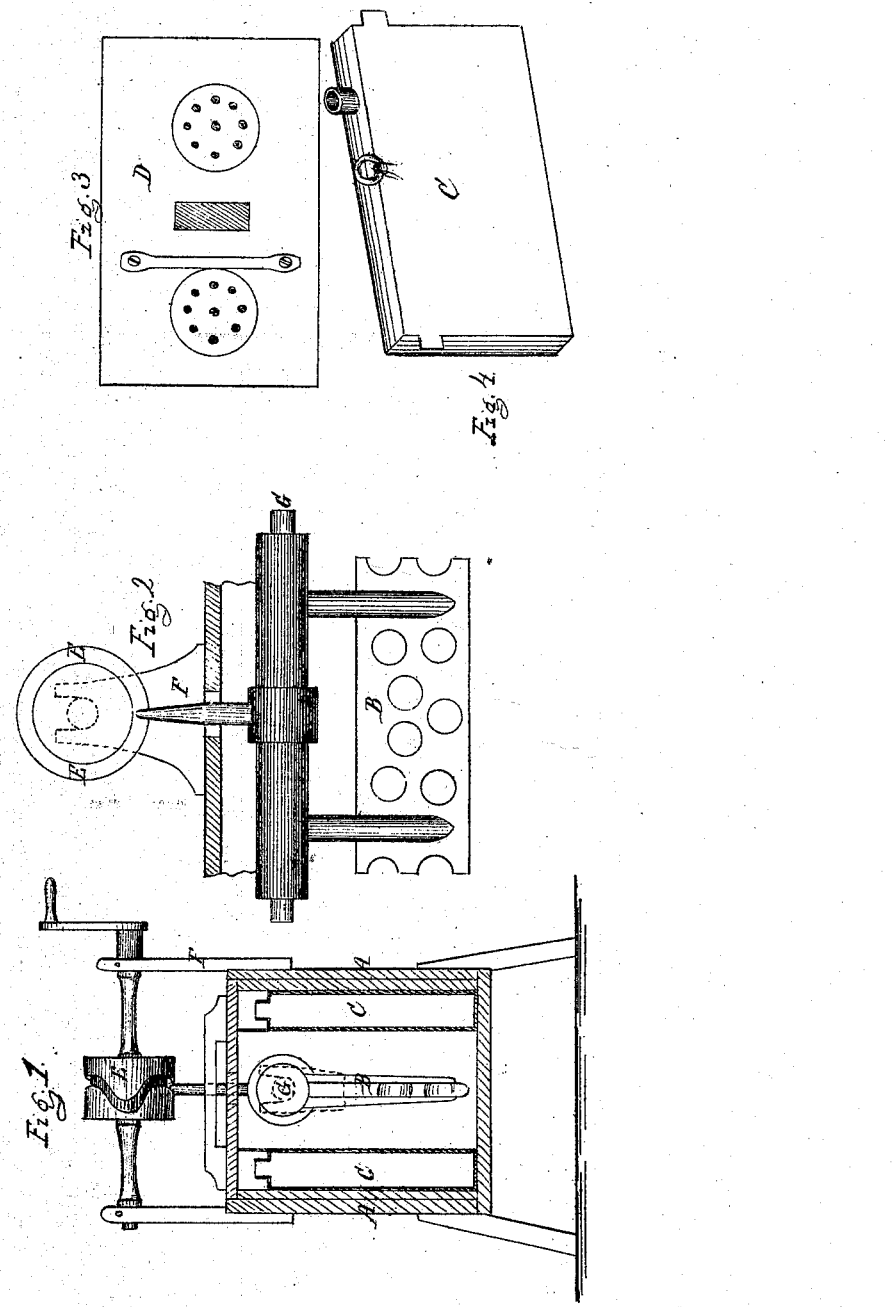

ROBERT ELARTON AND WILLIAM J. ELARTON, OF HILLSBOROUGH, IOWA.

Letters Patent No. 95,212, dated September 28, 1869; antedated September 16, 1869.

IMPROVEMENT IN CHURNS.

The Schedule referred to in these Letters Patent and making part of the same.

*To all whom it may concern:*

Be it known that we, ROBERT ELARTON and WILLIAM J. ELARTON, of Hillsborough, in the county of Henry, and State of Iowa, have invented a new and useful Improvement in Churns; and we do hereby declare that the following is a full, clear, and exact description of the same, reference being had to the annexed drawings, making part of this specification, in which—

Figure 1 is a transverse vertical section of our improved churn, showing the dasher, and the water-reservoir in position.

Figure 2 is a detached view of the dasher, showing its relations to the cam-wheel, from which it derives its motion.

Figure 3 is a plan or top view, and

Figure 4 is a perspective view of one of the water-reservoirs.

Corresponding letters refer to corresponding parts in the several figures.

This invention relates to churns; and

It consists in the combination and arrangement of the parts of which it is composed, as will be more fully explained hereafter.

A, in the drawings, represents a rectangular vessel, which may be made of wood, or other suitable material, and be supported upon legs at the proper height.

B represents a vibratory dasher, which is attached to the shaft C by suitable arms, it being formed or made of a length which permits it to vibrate freely within the vessel, which contains the material to be churned, and of any desired width, and perforated with a sufficient number of holes to give the required agitation and division of the cream or milk while being operated upon.

G represents the shaft to which the dasher is attached, and which has its bearings in lugs or boxes secured to the inner sides of the ends of the rectangular vessel.

Projecting upward from about the centre of this shaft, is an arm, the upper end of which is adapted to fit into a groove formed in the periphery of the wheel E.

D represents the cover of the churn or vessel A, it being provided with air apertures, which may be covered with perforated pieces of metal, to prevent the contents of the vessel from being forced out by the action of the dasher. It is also provided with an aperture through which the arm that operates the dasher works, as shown in fig. 3.

E represents a cam-wheel, which is secured to a shaft, which has its bearings secured to the ends of the vessel A. This wheel has a zigzag groove formed in its periphery, which receives the upper end of the arm which communicates motion to the dasher.

It will be seen that as the shaft above alluded to is revolved by the crank attached to its end, it carries with it the wheel E, which, by reason of the formation of the groove therein, imparts a reciprocating or vibratory motion to the arm, and consequently to the dasher, sufficient to give the required agitation to the contents of the churn.

C C represent rectangular vessels, which may be made of sheet-metal, and of a length which will cause them to fit snugly between the ends of the vessel A, their height being sufficient to cause their upper edges to nearly reach the upper edge of the vessel above referred to, and their thickness such as to leave a sufficient space between them for the movement of the dasher, as shown in fig. 1 of the drawings.

These vessels C are provided upon their upper edges with apertures, for the purpose of enabling the operator to pour in hot or cold water, as may be required, to give the proper temperature to the material to be acted upon.

They are also provided with rings upon their upper edges, by means of which they are readily removed from vessel A whenever it becomes necessary to do so, for the purpose of cleansing them or the vessels in which they are placed.

Having thus described our invention.

What we claim, and desire to secure by Letters Patent, is—

1. The arrangement of the vessels C C for containing water, with reference to the dasher B, substantially as shown and described.

2. The arrangement of cam-wheel E, shaft C, and dasher B, substantially as and for the purpose set forth.

In testimony whereof, we have signed our names to this specification, in the presence of two subscribing witnesses.

ROBERT ELARTON.
WILLIAM J. ELARTON.

Witnesses:
J. C. NEWBOLD,
J. L. JORDAN.